United States Patent [19]
Rosser et al.

[11] Patent Number: 5,543,856
[45] Date of Patent: Aug. 6, 1996

[54] SYSTEM AND METHOD FOR DOWNSTREAM APPLICATION AND CONTROL ELECTRONIC BILLBOARD SYSTEM

[75] Inventors: Roy J. Rosser; Brown F. Williams, both of Princeton, N.J.

[73] Assignee: Princeton Video Image, Inc., Princeton, N.J.

[21] Appl. No.: 518,657

[22] Filed: Aug. 24, 1995

Related U.S. Application Data

[63] Continuation of Ser. No. 143,938, Oct. 27, 1993, abandoned.

[51] Int. Cl.[6] .................................................. H04N 5/262
[52] U.S. Cl. .............................. 348/578; 348/589; 348/9
[58] Field of Search ............................ 348/6, 9, 12, 13, 348/1, 563, 564, 586, 588, 589, 578, 61, 722; 358/84, 86; H04N 7/16, 7/173, 5/262, 5/265, 5/272, 5/275

[56] References Cited

U.S. PATENT DOCUMENTS

| | | | |
|---|---|---|---|
| 4,528,589 | 7/1985 | Block et al. | 348/1 |
| 4,792,972 | 12/1988 | Cook, Jr. | 348/1 |
| 5,099,319 | 3/1992 | Esch et al. | 348/9 |
| 5,142,576 | 8/1992 | Nadan | 348/9 |
| 5,233,423 | 8/1993 | Jernigan et al. | 348/564 |
| 5,264,933 | 11/1993 | Rosser et al. | 348/61 |
| 5,309,174 | 5/1994 | Minkus | 345/204 |
| 5,488,675 | 1/1996 | Hanna | 348/589 |
| 5,491,517 | 2/1996 | Kreitman et al. | 348/581 |

Primary Examiner—Safet Metjahic
Assistant Examiner—Chris Grant
Attorney, Agent, or Firm—Richard C. Woodbridge

[57] ABSTRACT

A system and method are disclosed for authorizing, controlling, and monitoring the insertion of advertising indicia and other video images into a broadcast video stream by an Electronic Billboard system operated at a location remote from a video program origination location. The disclosed control means will be implemented in the form of a user key which is presupplied to an operator of the remote Electronic Billboard system, a broadcast key supplied to that operator at or near the time of transmission of the broadcast video stream, and a verification means operated in conjunction with the remote Electronic Billboard system to verify that those keys correspond to a predetermined criteria. Upon such verification, the remote Electronic Billboard system is enabled to operate on the broadcast video stream. The control means may also be applied for maintaining the integrity of either or both the products being advertised and the event being broadcast.

30 Claims, 2 Drawing Sheets under both the written copyright laws and contract laws. Nonetheless, it is not uncommon for the source of the program being transmitted to be altered after it leaves the originating facility. This occurs most regularly in live sports programs where the advertising breaks (so-called commercials) included in the original program are replaced by locally chosen ads by a downstream broadcaster.

SYSTEM AND METHOD FOR DOWNSTREAM APPLICATION AND CONTROL ELECTRONIC BILLBOARD SYSTEM

This application is a continuation of application Ser. No. 08/143,938 filed 10/27/93, now abandoned.

FIELD OF THE INVENTION

This invention relates to the use of Electronic Billboard systems in relation to television programming, and more particularly to the application and control of such systems at locations downstream in a transmission path from the originating program location.

CROSS REFERENCE TO RELATED APPLICATIONS

This invention is related to the invention disclosed in co-pending application Ser. No. 07/826,754, filed Jan. 28, 1992, now U.S. Pat. No. 5,264,933, issued Nov. 23, 1993, entitled TELEVISION DISPLAYS HAVING SELECTED INSERTED INDICIA, by the inventors herein and assigned to the same assignee, as well as a corresponding PCT application of the same title, U.S. Ser. No. 91/05174, filed Jul. 19, 1991. The invention is also related to British Patent Application Serial No. 9102995.9, entitled Electronic Billboard: A Method of Advertising Using Existing Television Transmission Facilities, filed Feb. 13, 1991 by Roy J. Rosser and Martin Leach (which application is based upon a provisional application filed Feb. 14, 1990) and to British Patent Application Serial No. 9019770.8, entitled Audio Electronic Billboard, filed Sep. 10, 1990 by Roy J. Rosser.

BACKGROUND OF THE INVENTION

In the cross-referenced related U.S. application (Ser. No. 07/826,754), a system and method are disclosed for the dynamic substitution of a chosen image or indicia into a preselected portion of an existing video image, such as may be depicted in a television program. That system, which is characterized as an "Electronic Billboard", operates to detect part or all of an object or objects within a video image and to thereafter use the position of that object or part thereof as a reference. The Electronic Billboard system then operates to replace a portion of the original video image, as identified by the position reference, with another still or video image chosen by the operator. The system further operates to position that replacement image in exact correspondence with the replaced portion of the original video image, such that the final composite image appears to a viewer as though it were the actual image being recorded by the video camera which created the original video image. In other words, the replacement image is seamlessly and realistically incorporated into the video image of the original event. Moreover, because of the dynamic substitution capability of the Electronic Billboard system, the appearance of the replacement image will continuously conform to the appearance of the original scene when that scene is moved, panned, magnified, zoomed, or otherwise altered in size or perspective.

As also explained in the disclosure for the "Electronic Billboard" invention, the pattern recognition software for the invention utilizes the "Burt Pyramid" algorithm, which, as is well known to those skilled in the art, is a very powerful methodology for processing, analyzing, and/or synthesizing video signals. Nonetheless, even though such pattern recognition software thereby achieves a processing speed which often permits real-time processing for the image replacement methodology of the invention, it was noted that, in some circumstances, a short time delay may be necessary in the transmission of the composite video image to accommodate the necessary processing. In such a circumstance, a frame-store means would be used with the Electronic Billboard in order to temporarily store a small number of video frames, thereby incorporating a time delay mechanism into the system.

In a preferred embodiment of the Electronic Billboard invention, the video image to be processed is a televised sports event. In such an application, the identified portion of the original video image to be replaced may be the image of the playing surface, or a portion thereof, and/or stationary surfaces which are part of a structure, such as a stadium, proximate to that playing surface. With this embodiment, the replacement image would typically be an advertising message. A useful example of such a preferred embodiment is a televised tennis match. There the actual video image of one or both halves of the tennis court, on which the match is being played, might be replaced by use of the Electronic Billboard, such that a viewer of the televised tennis match would see an advertisement, as on a billboard, appearing on the tennis court. It will, of course, be possible to locate the replacement image within the bounds of certain marked areas of the court, so as not to interfere with the television viewer's ability to determine when a tennis ball lands within or without such a marked area, or alternatively, to eliminate the substitute image during periods of active play on the court in question.

Where a televised program is distributed to a number of remote geographic locations, as from a network program origination location to a variety of network affiliates, it will, of course, be possible to locate such an Electronic Billboard system at the originating site (or the site from which the original program is electronically distributed), as well as at any position downstream from that originating location in the chain of distribution of that program to an user. Alternatively, it is possible to separate the Electronic Billboard functions of object detection/recognition and of image insertion/replacement, and provide two distinct systems, a "master" and a "slave" system. The "master" system, which does the initial image detection and recognition, and is essentially the front-end of the unitary Electronic Billboard system, is situated at the broadcast originating location. The second system, the "slave", which will be situated at a downstream location, is essentially the back-end of the unitary Electronic Billboard system and operates by receiving and operating on various parameters sent from the master system—in particular, information pertaining to the precise location of the inserted image, such as the coordinates of the origin of the site at which to locate the image to be inserted, and any other data necessary for the slave to successfully carry out the insertion of the required replacement image in the proper place and manner. The parameters passed from master to slave are essentially the same parameters transferred internally in the unitary Electronic Billboard. These parameters constitute a small volume of data compared to television signals. As such, in the master/slave arrangement, these parameters could either be transmitted from master to slave via a separate telephone link up, or they could be incorporated in the existing video signal, such as in the vertical blanking interval, as is done in the well known teletext broadcast systems, exemplified by the British Broadcasting Corporation's Ceefax service.

The program originator of a program such as described above will generally have a fight to control the distribution of the program at downstream locations, particularly with respect to advertising associated with such a program. Where such advertising is implemented through an Electronic Billboard system by a replacement of portions of the video image of the actual program content, as opposed to breaks in the program content, the exercise of such a control right becomes a critical concern.

In general, the downstream operator will distribute such a program pursuant to a license from the program originator and subject to financial obligations associated with such a license. Because the sub-distribution rights, and particularly the advertising rights, are likely to vary between different downstream operators, it is necessary that a control mechanism be available to the program originator for assuring compliance by each downstream operator with the terms of the particular license arrangement existing between the program originator and that downstream operator. However, with the unique capabilities of the Electronic Billboard system, there are presently no control mechanisms known for adequately protecting a program originator's rights in the use of such a system. It is, therefore, a principal object of this invention to implement such a control mechanism for use with the Electronic Billboard system.

It is expected that the television industry will adopt practices for the use of the electronic billboard broadly similar to those already established for advertising inserted in breaks between programs or program segments. Typically, the existing practice consists of a rights holder to a particular program or event transmitting that program or event to other broadcasters (downstream broadcasters) for use in their markets. The rights holder may or may not include advertising which the downstream broadcaster is required to broadcast. The downstream broadcaster may or may not have negotiated the right to use some or all of the time slots in and between program segments to insert advertising of its own, depending on the terms of an agreement (or license) between the network or original broadcaster and the downstream broadcaster for the use of the program.

As is well known, the television industry is highly dependent on the legitimate sharing of programs, whether within a network structure or not. Moreover, a critical aspect of these "sharing" relationships is that the actual sharing of programs takes place as intended (and as defined by contracts between the affected parties). Accordingly, much effort is put into monitoring what is actually transmitted by all of the broadcasters. With conventional broadcasting methods, accounting firms are retained for the task of monitoring the broadcasting of the programs, including the advertising content, the location of the advertising and the nature of competing advertising, in order to determine what programs and advertisements are actually transmitted.

It would of course be possible to apply these conventional control and audit techniques to program sharing and advertising implemented through an Electronic Billboard system, but the nature of the image substitution functionality for an Electronic Billboard system imposes two serious obstacles to the use of such conventional methods. First, the image substitutions take place throughout the entire program and not just at specific breaks, requiring that a great deal more broadcast or "air time" be monitored, with a likely substantial increase in the cost of such monitoring. Second, the subtle and seamless nature of the Electronic Billboard image substitutions can be expected to make the monitoring process far more difficult in practice, with consequent loss of accuracy—possibly a significant reduction in accuracy.

To overcome these limitations in an application of conventional methodologies to the control and monitoring of downstream program/advertising content using an Electronic Billboard, a novel means for authorizing, controlling, and monitoring the insertion of advertising indicia and other video images into the broadcast stream by an Electronic Billboard system has been developed and is disclosed herein. The disclosed control means may also be applied for maintaining the integrity of either or both the products being advertised and the event being broadcast. Additionally, this control means will be selectably usable, in conjunction with an Electronic Billboard system, to create a vertical stratification of the advertising market—such as the allowance of only certain modes of operation for the Electronic Billboard system, as, for example, the use of the substitution functionality only at times when active play is not taking place or only when certain players are or are not included in the televised scene.

SUMMARY OF INVENTION

A system and method for authorization and control of an Electronic Billboard system operated at a location remote from a video program origination location, and particularly for enabling a program originator to authorize, and maintain control over the use of such an Electronic Billboard system by downstream broadcasters relaying the original program, consisting of a user key, presupplied to an operator of the remotely located Electronic Billboard system, a broadcast key, supplied to that operator at or near the time of transmission of a video program to the remotely located Electronic Billboard system from the video program origination location, and a means operated in conjunction with the remotely located Electronic Billboard system for receiving and evaluating that user key and that broadcast key, whereby the remotely located Electronic Billboard system is enabled to operate on the transmitted video program upon those keys being found to correspond to a predetermined criteria.

DETAILED DESCRIPTION OF THE INVENTION

Figure 1:
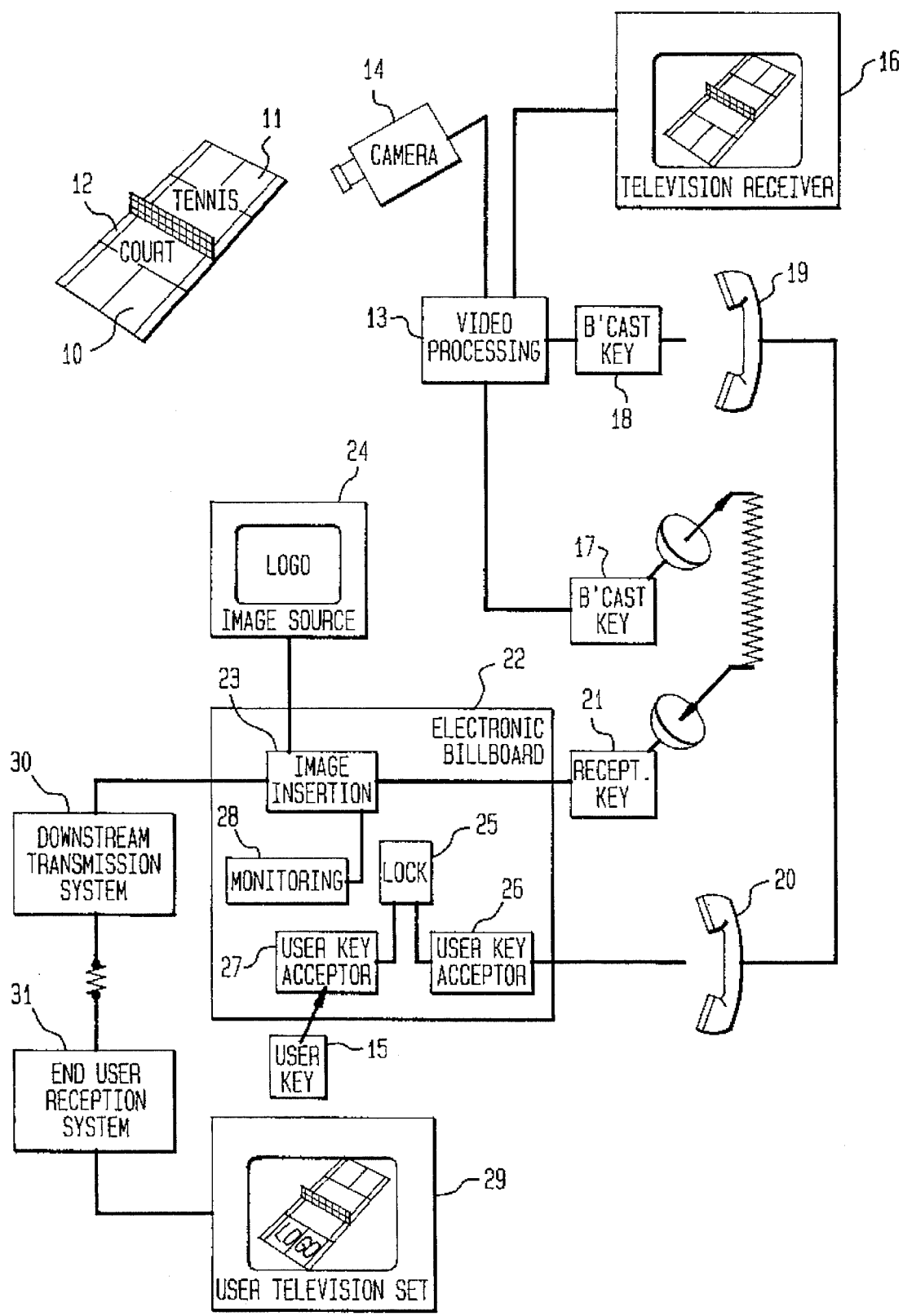
FIG. 1 is a block diagram of an apparatus for providing user and broadcast keys to an electronic billboard and monitoring of use of same according to the invention.

The authorization and control means of the invention is implemented through a "lock" incorporated in an Electronic Billboard system operated at a downstream location which disables the operation of such a downstream system, preventing it from being used to insert advertising indicia into programs received from the program originator, unless unlocked by an appropriate key. Such a lock may be implemented as a physical device consisting of electronic hardware, or it may be implemented as a software routine or any other suitable means of selectively disabling or preventing the use of the Electronic Billboard. The "key" for enabling operation of the downstream Electronic Billboard system may also be implemented as a physical device consisting of electronic hardware or it may be implemented as a software routine or any other suitable means of "opening" the lock, and thereby allowing the use of that downstream system. The key dement of the invention consists of two parts, a first part of which is presupplied to the downstream broadcaster (hereafter designated as "the user key") and the second part of which is incorporated in the video stream at or close to the time of actual broadcast (hereafter designated as "the broadcast key"). Only when the two matching keys reach the downstream Electronic Billboard system will the system function in its intended manner and allow the insertion of advertising indicia by the downstream broadcaster.

This method of controlling a downstream Electronic Billboard system may be implemented in a variety of ways, some of which also include automatic monitoring of some or all of the characteristics of the inserted indicia.

In a preferred embodiment of the invention, the user key will be supplied on a magnetic or optical diskette, cassette or other physical medium or device which is capable of storing information. The diskette or similar medium representing the user key may be supplied by the equipment vendor or by the rights holder of the program and may consist of a number of keys or a single key with a length-of-use limit or a number-of-uses limit. The diskette or other suitable medium will be inserted into or otherwise attached to the downstream Electronic Billboard system at or before the intended time of use of that system. The matching broadcast key will then be made available at or near the time of the program broadcast by the rights holder or its authorized agent. The broadcast key may be supplied in electronic form by telephone, by physical delivery, transmitted as part of the broadcast or in any other suitable way, and may be entered into the downstream Electronic Billboard system directly in electronic form or through various peripheral devices, such as a or keyboard, microphone, telephone modem or any other suitable means.

In this embodiment, the user key may be implemented as a physical device, such as the shape of a diskette, or a part thereof, or markings thereon (which may be in machine readable form or otherwise). Alternatively, it may be implemented through the functioning of a piece of electronic hardware attached to or incorporated in the diskette, such as a silicon chip or data embedded therein. Or, it may be implemented as software or software encrypted data prerecorded on the disk or any other suitable means of providing a key on such a diskette.

The broadcast key may be an alphanumeric or other sequence or code, and may be supplied verbally, or in data or electronic form via third-party transmission facilities, such as telephone lines, or via the video signal transmitted from the program originator, incorporated for instance in the vertical blanking signal of the television broadcast. Such a broadcast key may also be implemented as an actual part of the video image such as for instance an actual logo being inserted by an Electronic Billboard system at an upstream location.

Referring now to FIG. 1 there is shown a block diagram of the system of the invention, in which there is a depicted a typical tennis court 12 as illustrative of a sporting event to be televised using the system of the invention. The tennis court is shown in perspective and on either side of the net separating the court are shown a back court 11 and a forecourt 13. As also depicted in FIG. 1 a television camera 14 is deployed and operable for the purpose of recording the tennis match (or other sporting event). While the opposing players are not shown in the diagram, it will be apparent that they would be included in a televised broadcast of such an event. The output of camera 14 is coupled directly to a television receiver 16 which receives the video signal from the camera and provides a display of the televised image corresponding to the actual image recorded by camera 14. The output from camera 14 is also coupled, via conventional video processing equipment 13, to conventional broadcasting system 17 for broadcasting of the video signal from the camera to the site of a downstream broadcaster, who receives the signal via conventional reception system 21. Before rebroadcasting that received signal to its own audience, the downstream broadcaster may make use of an Electronic Billboard system 22 to insert an advertising message or indicia supplied from a second image source 24—which may be a slogan, an image, a logo or the like by image insertion means B. In accordance with the operation of the Electronic Billboard system, that advertising message will be displayed on selected portions of the tennis court in the image rebroadcast by the downstream broadcaster's transmission system 30. That television signal is received by the end user's reception system 31 and displayed on the end user's television set 29.

It is to be noted that camera 14 and associated processing and broadcasting equipment 13 are conventional components and therefore capable of providing a typical, normal, unaltered television signal and display. The distribution of the television from the upstream broadcaster, as accomplished via transmission/reception system 17 and 21, may be a wireless broadcast, a wireless transmission via satellite or a cable system. Such systems for distributing television signals are well known. The distribution of the television signal from the downstream broadcaster to the end user, as accomplished via transmission and reception systems 30 and 31, may also be a wireless broadcast, a wireless broadcast via satellite or a cable network.

The control of the downstream Electronic Billboard system according to the invention is accomplished by means of a two part key, a user key 15 and a broadcast key 18, in conjunction with a lock 25 located in the downstream Electronic Billboard system.

As described previously, user key 15 is presupplied to the downstream broadcaster and, upon receipt by the downstream broadcaster, will be entered into user-key acceptor 27. User-key acceptor 27 and user-key 15 may take a number of forms, including, but not limiting to, information input from an electronically-linked peripheral device, a message or a signal prerecorded on magnetic or optical diskette to be read into the Electronic Billboard system via a well-known floppy disc drive, or a conventional magnetic video or audio tape to be read in via a conventional tape reader. User-key 15 may also be implemented in a well-known read only memory (ROM) pack, a magnetic strip on a card similar to conventional credit cards, or any other electronic, magnetic, optical or physical device on which appropriate information or messages may be recorded, encoded or encrypted in a manner suitable for reading or deciphering by user-key acceptor 27. In the case where user-key acceptor 27 is a keyboard or a similar well-known input device, such as a mouse or trackball, user-key 15 may simply be an alphanumeric code or password to be entered by an operator. User-key acceptor 27 may also be used to modify or replace information stored in user-key 15 at the time of transmission, when the Electronic Billboard system is used to incorporate a substituted image into the broadcast video signal, for the purpose of monitoring what is actually rebroadcast. This recorded information may include, but will not be limited to, all or part of such information as the timing and length of the insertion, the nature and position of the insertion or whatever else is deemed appropriate to assist in the monitoring of the transmission for checking or enforcing compliance with agreed contracts for the use of the electronic billboard.

Broadcast-key 18 may take several forms, including a sequence of commands generated using video processing equipment 13, and will be supplied to the downstream Electronic Billboard system at or just before the broadcast. As previously discussed, broadcastkey 18 may be transmitted to the downstream broadcaster as part of the broadcast itself, or it may be supplied via a modem and telephone 19 through a conventional telephone line to a telephone and modem 20 at the downstream broadcast site. Upon receipt at the downstream broadcast site it will be relayed into the Electronic Billboard system by broadcast-key acceptor 26. The broadcast-key acceptor may be implemented as a processor for decoding a broadcast key sent as part of the broadcast stream, as a modem or any other suitable means of accepting the information from the broadcast-key, or simply as a socket for electrical connection to the Electronic Billboard system. It may also be that broadcast-key acceptor 26 and user-key acceptor 27 are realized in the same physical device, as for instance in the case where they are each implemented in a keyboard, and both the broadcast-key and the user-key are simply alphanumeric codes or passwords.

In addition to supplying the broadcast key, the rights holder may also provide the material to be inserted by the electronic billboard. Such material to be inserted may be provided with the diskette or similar medium on which the user key is placed, or on a separate diskette, via telephone, or on the video channel either prior to the broadcast of the event in which it is to be inserted or even during the broadcast.

Upon receipt of broadcast-key 18 by the downstream broadcaster, that key will be used in conjunction with the user-key 15 (already in the possession of the downstream broadcaster), to activate lock 25, and thereby permit the downstream Electronic Billboard system to operate on the received video signal to effect a desired video image substitution. As will be understood, the essential purpose of Lock 25 is to check for the existence of both the broadcast-key 18 and the user-key 15, or the presence of information realized from those keys, and to use that existence or information as a basis for allowing the Electronic Billboard system to function, or to function in a certain manner. Lock 25 may be implemented as an electronic circuit or as a software routine (or part thereof) in the Electronic Billboard system.

The two keys, or the information derived from them, may be checked against one another or against information stored in the Electronic Billboard system (or a combination of such checks), to ascertain the authenticity of the keys and, as well, the permitted timing or mode of use of the Electronic Billboard system. Indeed as will be readily understood, any desirable combination of checks and/or authorizations for operation of the downstream Electronic Billboard system (including particular modes of such operation) may be implemented through the functioning of lock 25. The lock would thus enable such operation of the downstream Electronic Billboard system as its software or hardware determined were authorized, through an interface with the main control processor of the Electronic Billboard system. A variety of software and/or hardware means for the authorization and control of other electronic software or hardware will be known to those skilled in the art of electronic design and programming, and any of such means may be implemented to perform this function of the invention.

The matching of the user key and the broadcast key, as performed by hardware or software in the Electronic Billboard system, may be used either to allow the downstream broadcaster to insert advertising wherever deemed appropriate for a given length of time, or it may control the specific location and time of display of the inserted advertising.

As a further enhancement of the invention, lock 25 may be implemented such that, upon determining that both keys are present and operation thereby authorized, an additional function will also be activated whereby certain characteristics of the output stream of the Electronic Billboard system will be recorded, for the purpose of monitoring the use of that system. This monitoring may take the form of recording data on user-key 15 via user-key acceptor 27 (for later retrieval from that user key), or of sending data to the broadcaster via broadcast key acceptor 26 and the chain of communication used to deliver broadcast key 18 (or the information contained therein), such as the telephone and modem link 20 and 19, for review and/or recording at the broadcast site.

The use of a diskette system to implement the user-key will be particularly advantageous in regard to such a monitoring function. Monitored data, such as the number of insertions, the time and length of insertions, the nature of the insertions and even the insertions themselves would be recorded on such a diskette system. As part of the agreed contract, these diskettes would be returned to one or more of the Electronic Billboard systems vendors, the accountants, the rights holder or other suitable parties to confirm that the contracts agreed to were adhered to.

Implementation of such a monitoring function using the broadcast-key system may include simply a passive monitoring or may be used for the purpose of controlling the sending of the broadcast signal to the downstream broadcaster by the rights holder.

The monitoring function may also be implemented through activation of a separate recording device 28, either at the downstream broadcaster's site or at some end user site. Such a separate recording device may record the entire broadcast stream from the Electronic Billboard system or it may record aspects of the broadcast relevant to particular Electronic Billboard system functions which have been authorized by the rights holder. Among such functions which may be monitored are the timing, position, duration and nature of the substitute video images to be inserted by the downstream broadcaster.

Figure 2:
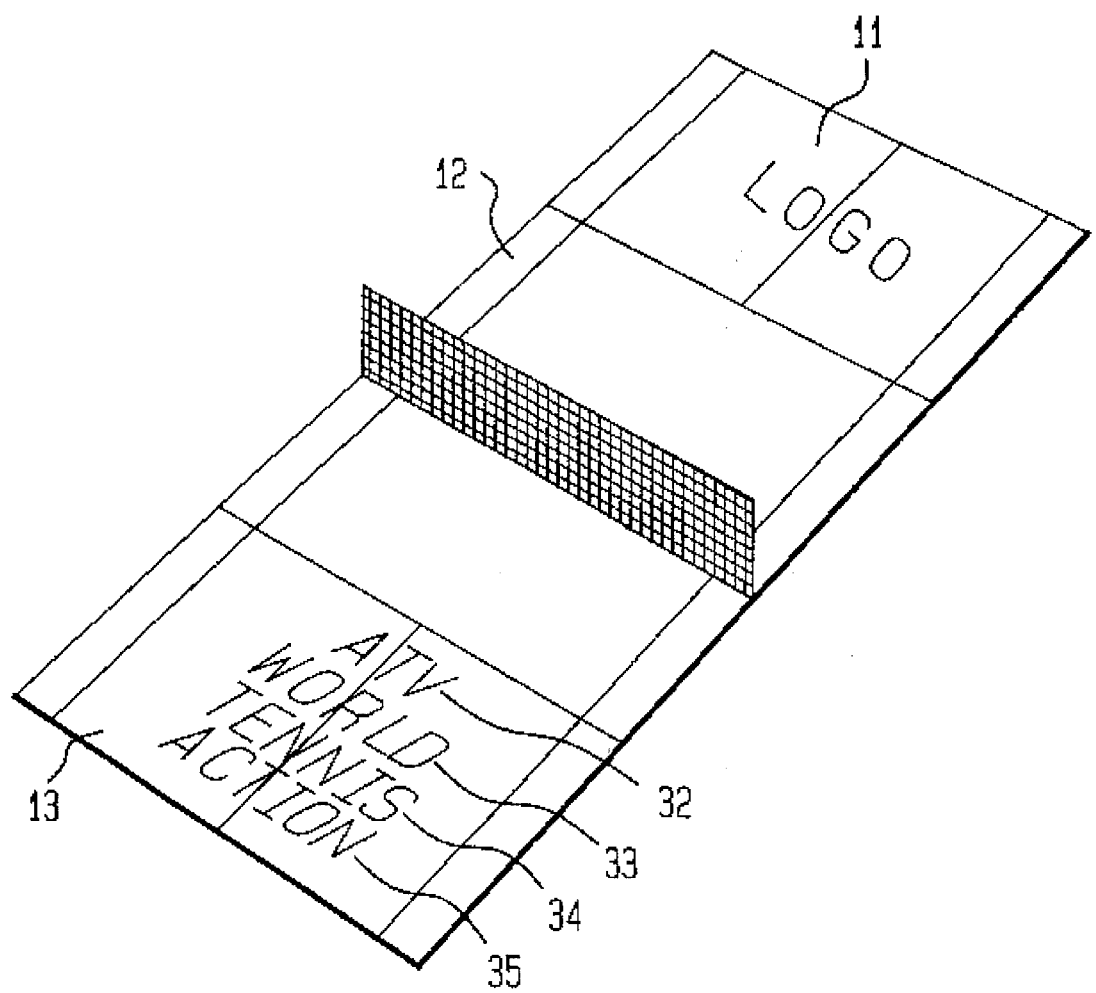
FIG. 2 is a perspective plan of a television image received by a downstream broadcaster showing how an indicia inserted by the program originator can be used as an authorized control for the timing, nature and positioning of further indicia inserted by the downstream broadcaster.

An alternative embodiment of the invention is schematically depicted in FIG. 2. In this embodiment the program originator will also use an Electronic Billboard system at the source of the broadcast in order to insert substitute video indicia for "national" advertising and which substitute indicia may also be used for the control of further insertion of advertising in the program video stream by downstream broadcasters. FIG. 2 shows an event as seen by the downstream broadcaster for this embodiment. The event being shown once again uses the example of a tennis match, using a tennis court 12 with two halves 11 and 13. In backcourt 11 an advertising logo has been inserted by the program originator, intended for rebroadcast by the downstream broadcaster on to the television sets of the end users, while in the forecourt 13 an indicia has been inserted which may also act as a broadcast-key for appropriately authorized downstream users. As can be seen in FIG. 2, one possible means for providing the broadcastkey is as a substituted indicia advertising the rights-holder, so that non-authorized downstream broadcasters would merely rebroadcast that advertising for the rights holder on to the television sets of the end user.

However, authorized downstream broadcasters would have a user-key 18 containing information fed into the Electronic Billboard system by user-key acceptor 27 and lock 25, enabling the Electronic Billboard system to recognize the broadcast key in the substitute image shown on the forecourt 13. For example, in FIG. 2, the key may be the phrase "ATV" 32, while the rest of the three word slogan, "World Tennis Action," may in fact be a code to be recognized by the Electronic Billboard system and/or lock 25—such as by pattern or character recognition, and processed in accordance with predetermined intelligence. Illustrative examples of coding to be derived from the depicted image (forecourt 13) include the following: Word one (reference designator 33) may be "World" (as shown) or it may be "International" or it might be "Major". Similarly, the word in place two (reference designator 34) may be "Tennis" (as shown) or it may be "Sport" and the word in place three (reference designator 35) may be "Action" (as shown) or it may be "Live" or "Exclusive" or "Extravaganza" or "Entertainment" or "Drama" or "Coverage". The result is a broadcast key which will appear as a simple slogan to the end viewer if not replaced with downstream advertising, but which can be recognized by a downstream Electronic Billboard system as a broadcast key with 96 possible messages, assuming each of the words could also be left blank.

In a further embodiment of the invention it is possible to separate the Electronic Billboard system functions of object detection/recognition and of image insertion/replacement, and thereby provide two distinct operating systems, a "master" and a "slave" systems. The "master" system, which does the initial image detection and recognition, will be situated at the broadcast originating location. The second system, the "slave", which will be situated at a down-stream location, operates by receiving and operating on various parameters sent from the master system—in particular, information pertaining to the precise location of the inserted image, such as the coordinates of the origin of the site at which to locate the image to be inserted, and such other data as may be necessary for the slave to successfully carry out the insertion of the required replacement image in the proper place, time and manner. The parameters passed from master to slave are essentially the same parameters transferred internally in the unitary Electronic Billboard. These parameters constitute a small volume of data compared to television signals. Thus, in the master/slave arrangement, the parameters could either be transmitted from master to slave via a separate telephone link, or they could be incorporated in the existing video signal, such as in the vertical blanking interval, as is done in the well known teletext broadcast systems, exemplified by the British Broadcasting Corporation's Ceefax service. Authorization and control of such a slave processor would be carried out in like manner to that heretofore described as to operation of an independent remotely located Electronic Billboard system. As will be appreciated, downstream locations which did not wish to take advantage of the image replacement functionality of the slave system would simply distribute the original video image as received from the master system located at the originating video source.

Finally, we note that by using properly configured independently-operated, remotely-located Electronic Billboard systems and making available full information about the location and duration of the video insertion as well as the material to be inserted, the system of the invention will allow remote, unattended operation of such Electronic Billboard systems equipment.

Although the present embodiments of the invention have been described in detail, it should be understood that various changes, alterations and substitutions can be made therein without departing from the spirit and scope of the invention as defined by the appended claims.

We claim the following:

1. A system for authorization and control of an Electronic Billboard system operated at a location remote from a video program origination location comprising:

a user key, presupplied to the Electronic Billboard system;

a broadcast key, supplied to the Electronic Billboard system at or near a time of transmission of a video program to the Electronic Billboard system; and, means operated in conjunction with the Electronic Billboard system for selectively enabling the Electronic Billboard system to operate on said video program to effect a substitution of a chosen indicia into a preselected portion of image existing in said video program upon said user key and said broadcast key being found to correspond to a predetermined criteria, wherein said means for selectively enabling is implemented as a lock which operates to disable operation of the Electronic Billboard system unless said user key and said broadcast key conforming to said predetermined criteria are present.

2. The system of claim 1 wherein said lock is realized in electronic hardware interconnected with the Electronic Billboard system.

3. The system of claim 1 wherein said lock is realized in software operated by a processor associated with the Electronic Billboard system.

4. The system of claim 1 wherein said user key is supplied in the form of a medium capable of storing information.

5. The system of claim 4 wherein said user key is implemented in the form of data stored in said medium.

6. The system of claim 5 wherein said medium may also store data related to operation of the Electronic Billboard system other than said user key data.

7. The system of claim 1 wherein said user key is supplied in the form of a physical configuration.

8. The system of claim 1 wherein said broadcast key is supplied in an encoded form via a substituted video image inserted in said video program by an Electronic Billboard system operated at said program origination location.

9. The system of claim 1 wherein substitute video image data for use by the Electronic Billboard system is supplied to an operator thereof from said program origination location.

10. The system of claim 9 wherein said substitute video image data is supplied via a path of said transmission of said video program.

11. The system of claim 9 wherein said substitute video image data is supplied via a path separate from a path of said transmission of said video program.

12. A method for authorization and control of an Electronic Billboard system operated at a location remote from a video program origination location comprising the steps of:

presupplying a user key to the Electronic Billboard system in advance of an intended usage of the system;

supplying a broadcast key to the Electronic Billboard system at or near a time of transmission of a video program to the Electronic Billboard system from the video program origination location; and, selectively enabling the Electronic Billboard system to operate on said video program to effect a substitution of a chosen indicia into a preselected portion of an image existing in said video program upon said user key and said broadcast key being found to correspond to a predetermined criteria, wherein said step of selectively enabling the Electronic Billboard system is implemented as a lock which operates to disable operation of the Electronic Billboard system unless said user key and said broadcast key conforming to said predetermined criteria are present.

13. The method of claim 12 wherein said lock is realized in electronic hardware interconnected with the Electronic Billboard system.

14. The method of claim 12 wherein said lock is realized in software operated by a processor associated with said remotely located Electronic Billboard system.

15. The method of claim 12 wherein said user key is supplied in the form of a medium capable of storing information.

16. The method of claim 15 wherein said user key is implemented in the form of data stored in said medium.

17. The method of claim 11 wherein said medium may also store data related to operation of the Electronic Billboard system other than said user key data.

18. The method of claim 12 wherein said user key is supplied in the form of a physical configuration.

19. The method of claim 12 wherein said user key is supplied in the form of data stored in an electronic device.

20. The method of claim 12 wherein said broadcast key is supplied in an encoded form via a substituted video image inserted in said video program by an Electronic Billboard system operated at said program origination location.

21. The method of claim 12 wherein substitute video image data for use by the Electronic Billboard system is supplied to an operator thereof from said program origination location.

22. The method of claim 21 wherein said substitute video image data is supplied via a path of said transmission of said video program.

23. The method of claim 21 wherein said substitute video image data is supplied via a path separate from a path of said transmission of said video program.

24. A system for authorization and control of an electronic billboard system including obtaining a video signal at a video program origination location and first indicia location means for identifying the location of a first indicia which is a portion of a video field in a said video signal and transmitting said video signal to a location remote from said video programming originalion location where a second indicia is substituted for said first indicia, said system comprising:

a user key presupplied to said remote location;

a broadcast key supplied to said remote location at or near the time of transmission of said video signal, a first indicia location signal also supplied to said remote location at or near the time of transmission of said video signal; and, means responsive to said user key and said broadcast key for selectively enabling the remote location to replace said first indicia with said second indica in said video signal, wherein the location of said second indicia is determined by said first indicia location signal which is generated by said first indicia location means.

25. The system of claim 24 wherein said first and second indicia are advertisements.

26. A method for authorizing and controlling an electronic billboard system including a video program origination location and first indicia location means for locating a first indicia comprising a portion of a video field in a video signal and transmitting said video signal to a location remote from said video programming origination location where a second indicia is substituted for said first indicia, said method comprising the steps of:

presupplying a user key to the electronic billboard system in advance of an intended usage of the system;

supplying a broadcast key to said remote location at or near the time of transmission of said video signal, supplying a first indicia location signal to said remote location at or near the time of transmission of said video signal; and, selectively enabling said remote location in response to the receipt of said user key and said broadcast key to cause the replacement of said first indicia by said second indicia at said remote location, wherein the location of said second indicia is determined by said first indicia location signal which is generated by said first indicia location means.

27. The method of claim 26 wherein said first and second indicia comprise advertisements.

28. In an electronic billboard system including a video program origination location having first video advertisement location means for identifying the location of a first video advertisement in a portion of a video field in a video signal and transmitting said video signal to a remote location where a second advertisement is selectively substituted for said first advertisement, the system further including:

user key presupplied to said remote location;

broadcast key supplied to said remote location at or near the time of transmission of said video signal;

a first advertisement indicia location signal also supplied to said remote location at or near the time of transmission of said video signal and, means responsive to said user key and said broadcast key for selectively enabling said remote location to determine the location of said first advertisement in said video signal and to replace said first advertisement with said second advertisement at said remote location, wherein the location of said second advertisement is determined by said first advertisement indicia location signal which is generated by said first video advertisement location means.

29. An electronic billboard system comprising:

means for capturing a video signal at a video programming origination location indicia location means for identifying the location of a first indicia which is a portion of a video field in said video signal and producing a first indicia location signal in response thereto;

transmission means for transmitting said video signal to a remote location separated from said video programming originalion location, said transmission means also transmitting said first indicia location signal at or near the time of said broadcast of said video signal; and, remote location means for selectively substituting a second indicia for said first indicia at a location in said video field dictated by said first indicia location signal.

30. A method for controlling an electronic billboard system comprising the steps or:

obtaining a video signal at a video program origination location;

employing first indicia location means to locate a first indicia which is a portion of a video field in said video signal;

producing a first indicia location signal by means of said first indicia location means including information with regard to the location of said first indicia;

transmitting said video signal to a remote location separate from said video programming origination location;

transmitting said first indicia location signal to said remote location at or near the time of transmission of said video signal;

selectively replacing said first indicia with said second indicia at said remote location in said video field at a location determined by said first indicia location signal.

* * * * *